US009322394B2

(12) United States Patent
Pitre

(10) Patent No.: US 9,322,394 B2
(45) Date of Patent: Apr. 26, 2016

(54) PLATFORM FOR GENERATING ELECTRICITY FROM FLOWING FLUID USING GENERALLY PROLATE TURBINE

(71) Applicant: Natural Power Concepts, Inc., Honolulu, HI (US)

(72) Inventor: John Pitre, Honolulu, HI (US)

(73) Assignee: Natural Power Concepts, Inc., Honolulu, HI (US)

( * ) Notice: Subject to any disclaimer, the term of this patent is extended or adjusted under 35 U.S.C. 154(b) by 0 days.

(21) Appl. No.: 14/219,645

(22) Filed: Mar. 19, 2014

(65) Prior Publication Data

US 2014/0203564 A1 Jul. 24, 2014

Related U.S. Application Data

(63) Continuation of application No. 13/684,723, filed on Nov. 26, 2012, now Pat. No. 8,710,688, which is a continuation of application No. 12/461,717, filed on Aug. 21, 2009, now Pat. No. 8,344,535.

(Continued)

(51) Int. Cl.
*F03B 13/00* (2006.01)
*H02P 9/04* (2006.01)
(Continued)

(52) U.S. Cl.
CPC ............... *F03D 9/008* (2013.01); *B63B 35/44* (2013.01); *F03B 13/10* (2013.01); *F03B 17/061* (2013.01);
(Continued)

(58) Field of Classification Search
CPC .......... F03D 9/008; F03D 9/002; F03D 9/00; F03D 11/04; F03B 13/10; F03B 17/061; B63B 35/44; B63B 1/121; B63B 2035/4466; B63B 2035/446; F05B 2240/932; F05B 2240/243; F05B 2250/25; Y02E 10/28; Y02E 10/727; Y02E 10/38; H02K 7/1807

USPC ......... 290/54, 55, 53, 44, 43, 42; 416/120, 85
See application file for complete search history.

(56) References Cited

U.S. PATENT DOCUMENTS 868,798 A 10/1907 McLaughlin
872,140 A 11/1907 Mikuiasek
(Continued)

FOREIGN PATENT DOCUMENTS

GB 2468853 A 9/2010
JP 57206779 A 12/1982
(Continued)

OTHER PUBLICATIONS

Bedard et al., "North America Tidal In-Stream Energy Conversion Technology Feasibility Study," EPRI, Jun. 11, 2006.
(Continued)

*Primary Examiner* — Javaid Nasri
(74) *Attorney, Agent, or Firm* — Novak Druce Connolly Bove + Quigg LLP

(57) ABSTRACT

A platform-like device for generating electricity from moving fluids has at least two fluid turbines coupled to one another through a frame. The fluid turbines are adapted to rotate in opposite directions. The fluid turbines also provide buoyancy for the platform so that the platform is self supporting in the water. The fluid turbines preferably have helicoid flights (screw-like threads) mounted to generally prolate casings. The fluid turbines preferably connect to electric generators through belt, chain-drive, or other transmission systems. The platform may additional support a wind turbine.

8 Claims, 10 Drawing Sheets

Related U.S. Application Data

(60) Provisional application No. 61/213,829, filed on Jul. 20, 2009, provisional application No. 61/202,189, filed on Feb. 4, 2009, provisional application No. 61/202,126, filed on Jan. 30, 2009, provisional application No. 61/189,950, filed on Aug. 22, 2008.

(51) Int. Cl.
| | |
|---|---|
| *F03D 9/00* | (2016.01) |
| *B63B 35/44* | (2006.01) |
| *F03B 17/06* | (2006.01) |
| *F03D 11/04* | (2006.01) |
| *H02K 7/18* | (2006.01) |
| *F03B 13/10* | (2006.01) |
| *B63B 1/12* | (2006.01) |

(52) U.S. Cl.
CPC ............... *F03D 9/002* (2013.01); *F03D 11/04* (2013.01); *H02K 7/1807* (2013.01); *B63B 1/121* (2013.01); *B63B 2035/446* (2013.01); *B63B 2035/4466* (2013.01); *F05B 2240/243* (2013.01); *F05B 2240/932* (2013.01); *F05B 2250/25* (2013.01); *Y02E 10/28* (2013.01); *Y02E 10/38* (2013.01); *Y02E 10/727* (2013.01)

(56) References Cited

U.S. PATENT DOCUMENTS

| | | | |
|---|---|---|---|
| 889,883 A | 6/1908 | Johnson | |
| 1,025,929 A | 5/1912 | Snook | |
| 1,307,021 A | 6/1919 | Peters | |
| 1,431,440 A | 10/1922 | Burch | |
| 1,461,502 A | 7/1923 | Solinger et al. | |
| 1,555,879 A | 10/1925 | Ruzicka | |
| 2,067,770 A | 1/1937 | Lembas | |
| 2,237,857 A | 4/1941 | Winderl | |
| 3,233,574 A | 2/1966 | Justinien | |
| 3,238,911 A | 3/1966 | Pazulski | |
| 3,381,650 A | 5/1968 | Itoh et al. | |
| 3,697,765 A | 10/1972 | Carini | |
| 4,057,270 A | 11/1977 | Lebost | |
| 4,258,271 A | 3/1981 | Chappell et al. | |
| 4,367,413 A | 1/1983 | Nair | |
| 4,412,417 A | 11/1983 | Dementhon | |
| 4,500,259 A | 2/1985 | Schumacher | |
| 4,717,832 A | 1/1988 | Harris | |
| 4,734,067 A | 3/1988 | Elias-Reyes | |
| 4,816,697 A | 3/1989 | Nalbandyan et al. | |
| 4,849,647 A | 7/1989 | McKenzie | |
| 5,506,453 A | 4/1996 | McCombs | |
| 5,509,370 A | 4/1996 | Kovacs et al. | |
| 5,642,984 A * | 7/1997 | Gorlov | 416/176 |
| 5,760,515 A | 6/1998 | Burns | |
| 5,810,289 A | 9/1998 | Sager | |
| 5,946,909 A | 9/1999 | Szpur | |
| 6,127,739 A | 10/2000 | Appa | |
| 6,168,373 B1 | 1/2001 | Vauthier | |
| 6,249,058 B1 | 6/2001 | Rea | |
| 6,278,197 B1 | 8/2001 | Appa | |
| 6,626,638 B2 | 9/2003 | Rosefsky | |
| 6,741,000 B2 | 5/2004 | Newcomb | |
| 6,858,036 B1 | 2/2005 | Kim | |
| 7,063,579 B2 | 6/2006 | Voves | |
| 7,199,484 B2 | 4/2007 | Brashears | |
| 7,358,623 B2 | 4/2008 | Richards et al. | |
| 7,728,454 B1 | 6/2010 | Anderson, Jr. | |
| 7,911,074 B2 | 3/2011 | Anderson | |
| 8,344,535 B2 | 1/2013 | Pitre | |
| 2005/0118903 A1 | 6/2005 | Leonov et al. | |
| 2007/0126240 A1 | 6/2007 | Richards et al. | |
| 2007/0241566 A1 | 10/2007 | Kuehnle | |
| 2010/0140942 A1 | 6/2010 | Pitre | |
| 2013/0076038 A1 | 3/2013 | Pitre | |

FOREIGN PATENT DOCUMENTS

| | | | |
|---|---|---|---|
| JP | 2001248532 A | | 9/2001 |
| JP | 2002081362 A | | 3/2002 |
| JP | 2006183648 A | | 7/2006 |
| KR | 1020070119311 | | 12/2007 |

OTHER PUBLICATIONS

Toyota, "Activities on Ocean Energy in Japan," IEA Meeting, Nov. 14, 2006.
"The Race Rocks Tidal Energy Project," Clean Current Power Systems, Inc. 2008.
"Technology Evaluation of Existing and Emerging Technologies—Water Current Turbines for River Applications," Natural Resources Canada, Jun. 15, 2006.
International Search Report and Written Opinion, International Application No. PCT/US2009/004770, mailed Mar. 24, 2010.
Internation Preliminary Report on Patenrability, International Application No. PCT/US2009/004770, mailed Mar. 3, 2011.
Examination Report under Section 18(3), UK Application No. GB1104664.6, dated Dec. 9, 2011.
Response to Communication dated Dec. 9, 2011, UK Application No. 1104664.6, dated May 15, 2012.
Examination Report under Section 18(3), UK Application No. GB1104664.6, dated Jul. 11, 2012.

* cited by examiner

PLATFORM FOR GENERATING ELECTRICITY FROM FLOWING FLUID USING GENERALLY PROLATE TURBINE

CROSS-REFERENCE TO RELATED APPLICATIONS

This application is a continuation of U.S. application Ser. No. 13/684,723 now U.S. Pat. No. 8,710,688 entitled, "Platform for Generating Electricity from Flowing Fluid Using Generally Prolate Turbine," and filed Nov. 26, 2012, which is a continuation of U.S. application Ser. No. 12/461,717 now U.S. Pat. No. 8,344,535 entitled, "Platform for Generating Electricity from Flowing Fluid Using Generally Prolate Turbine," and filed Aug. 21, 2009, the disclosures of which are incorporated herein by reference in their entireties, which claims priority to:

(1) U.S. Provisional Patent Application 61/202,126 entitled, "Apparatus for Generating Electricity from Flowing Fluid Using Generally Prolate Turbine," and filed Jan. 30, 2009, the disclosure of which is incorporated herein by reference in its entirety;

(2) U.S. Patent Application 61/202,189 entitled "Folding Blade Turbine," and filed Feb. 4, 2009, the disclosure of which is incorporated herein by reference in its entirety;

(3). U.S. Provisional Patent Application 61/189,950 entitled, "Fine Arts Innovations," and filed Aug. 22, 2008, the disclosure of which is incorporated herein by reference in its entirety; and (4) U.S. Patent Application 61/213,829 entitled "Platform for Generating Electricity from Flowing Fluid using Generally Prolate Turbine" and filed Jul. 20, 2009, the disclosure of which is incorporated herein by reference in its entirety.

STATEMENT REGARDING FEDERALLY SPONSORED RESEARCH OR DEVELOPMENT

None.

NAMES OF THE PARTIES TO A JOINT RESEARCH AGREEMENT

None.

BACKGROUND

The generation of electricity from water today predominantly uses impoundments, such as dams.

To convert water currents into electricity without impoundments, in-stream energy conversion devices are placed in a flowing stream. According to the Electric Power Research Institute, such in-stream electricity generation without using impoundments remains a largely untapped potential. See, e.g., "North American Ocean Energy Status," Electric Power Research Institute, March 2007. This report states that the world's first marine renewable energy system of significant size to be installed in a genuinely offshore location was the Marine Current Turbine (MCT) 300 kw experimental SeaFlow unit installed off the coast of Devon, UK in May 2003. The MCT SeaFlow unit used a rotating, axial-flow turbine using hydrodynamic, generally planar blades as working members. (The term "working member" here refers to a member having a surface that functions to react with a working fluid, such as water, such that movement of a working fluid causes movement of the working member.) The report discusses other in-stream projects that use axial-flow turbines with generally planar blades. The Verdant Power 5.5 axial flow turbines were installed in the East River of New York beginning in December 2006. The Canadian Race Rocks British Columbia Tidal Project delivered electricity for the first time in December 2006.

SUMMARY

An object of some embodiments of the invention is to provide an improved, in-stream platform for generating electricity from fluid flows, especially relatively shallow river and tidal flows. Other objects of some embodiments of the invention are to provide:

(a) self-buoyant platforms for generating electricity from fluid flows;

(b) platforms for generating electricity from fluid flows with low impact on the marine wildlife and the marine environment;

(c) platforms for generating electricity from fluid flows subject to icing;

(d) portable platforms for generating electricity from fluid flows;

(e) improved apparatus for generating electricity at low cost; and (f) scalable arrangements of apparatus for generating electricity; and (e) improved apparatus for generating electricity from the combination of water flow and air flow.

These and other objects may be achieved by providing a platform that includes pairs of hydro turbines that use a generally helicoid working member, similar to screw threads, to convert a stream flow into rotational motion of a generally prolate carrier. (By way of non-limiting example, a football could be considered as having a prolate shape.) Helicoid working members on the exterior of such carriers tend to (a) reject debris, (b) avoid catching or otherwise harming marine life, and (c) have improved properties for continued operation in conditions that cause surface icing. The generally prolate shape provides buoyancy through water displacement to support electrical generators and other equipment loaded onto the platform. The generally prolate shape can accelerate fluid flow around its periphery and provide an increased radial moment and increased torque about its central axis when compared to comparably-sized working members on a circular cylinder.

The hydro turbine can generate electricity when flowing fluid impinges on the helicoid working members and causes the working members to rotate. The rotating working member couples to a drive system, which then transfers the rotational energy to at least one electric generator. The turbines counter rotate so that net torques on the platform at least partially (and preferably totally) cancel. For each of discussion, embodiments of the invention are described herein with respect to electricity generated from water flow, although electricity generated from any fluid flow is contemplated as well.

Additionally, a wind turbine can be used in combination with the hydro turbines. The wind turbine is securely positioned upon a housing of the platform, where the wind turbine uses multiple blades to convert the kinetic energy of the wind into rotational energy. The combination of the hydro turbines and a wind turbine provides multiple, possibly uncorrelated sources of energy conversion, and which yields a greater net energy output with lower variability than two sources alone. Multiple platforms may be anchored in groups in tidal, river, or other streams, while still have a low environmental impact.

BRIEF DESCRIPTION OF THE SEVERAL VIEWS OF THE DRAWING

Reference will be made to the following drawings, which illustrate preferred embodiments of the invention as contemplated by the inventor(s).

DETAILED DESCRIPTION OF THE INVENTION

Figure 1:
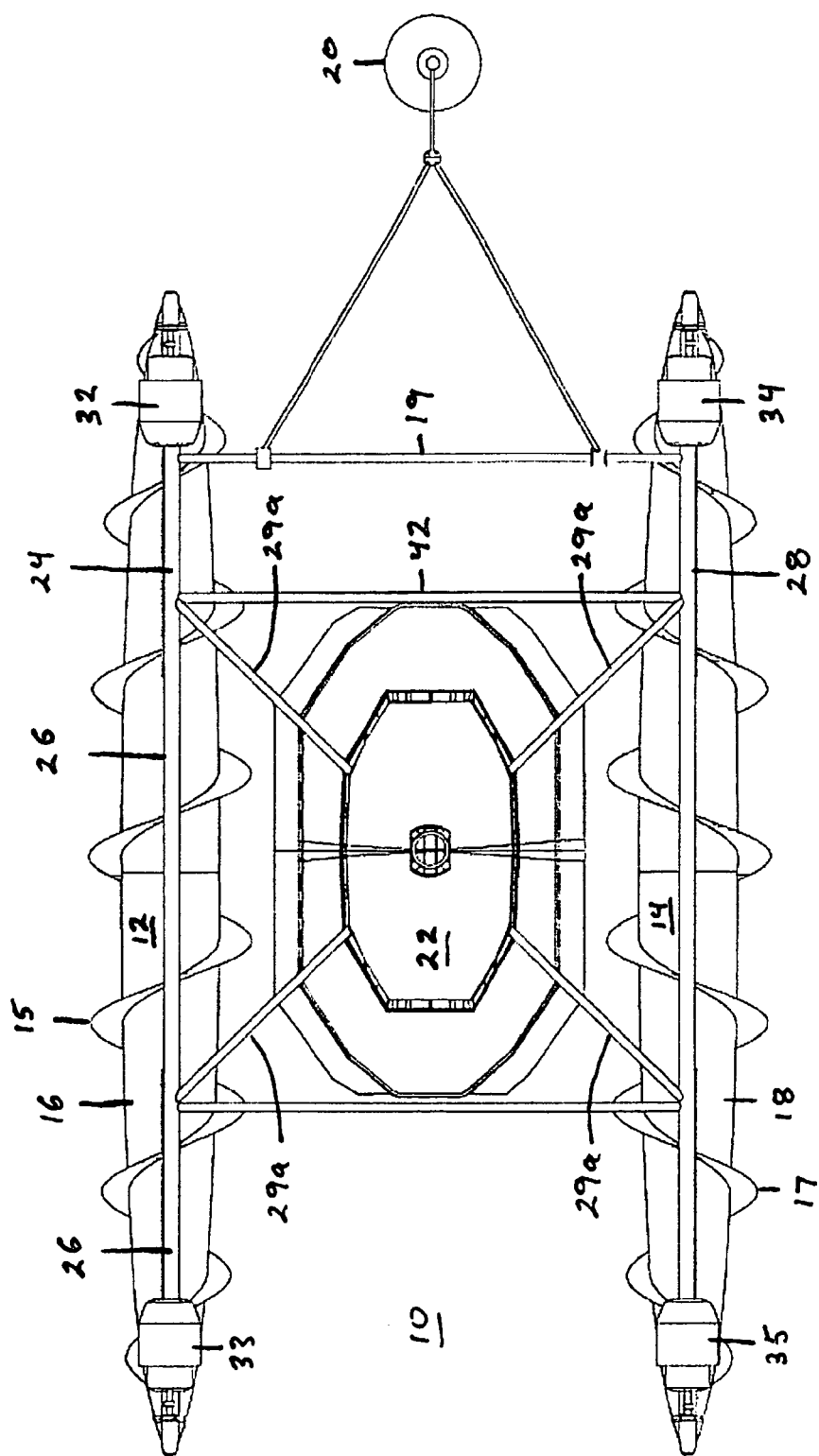
FIG. 1 illustrates a top plan view of a platform for generating electricity from a flowing fluid.

FIG. 1 illustrates a top view of an exemplary platform 10 for generating electricity from flowing fluid. The platform 10 is illustrated as attached at one end to a mooring, such as by way of a buoy 20. For purposes of description, the end of the platform 10 shown attached to the buoy 20 may be referred to as the "forward" end, while the opposite side may be referred to as the "aft" end. As viewed from the aft end looking forward, the left side of the platform 10 may be referred to as the "port" side, while the right side may be referred to as the "starboard" side.

The platform 10 includes a frame having a port longitudinal side member 26 running forward and aft along the port side of platform 10 and a starboard longitudinal side member 28 running forward and aft along the starboard side of platform 10. Additional frame members (discussed further below) hold the side members 26, 28 in preferably generally parallel, spaced apart alignment. The port side member 26 holds a port-side, preferably generally-prolate hydro turbine 12 in a position running forward and aft along the port side of platform 10. The starboard longitudinal side member 28 holds a starboard-side, generally-prolate hydro turbine 14 in a position running forward and aft along the starboard side of platform 10.

Preferred hydro turbines 12, 14 have helicoid working members (similar to screw threads) 15, 17 coiling around the exterior of water-tight, generally-prolate casings 16, 18. The casings 16, 18 of the turbines 12, 14 are generally prolate, that is, generally symmetrical about a central axis, wider in the middle, and narrower at the ends. While generally prolate casings are desired, the degree of curvature may vary, and the casings need not be a mathematically perfect prolate shape. The turbines 12, 14 preferably have sufficient displacement to be positively buoyant and to hold the platform 10 at or above the surface of the water. It is preferred that the turbines 12, 14 provide sufficient buoyancy to support the frame and generators while holding the housing at or above the water line. The turbines 12, 14 may be fully submerged or partially submerged with no less than one third of their diameters in the water. If additional structures are provided that are fully or partially submerged, or that otherwise offset the weight of the craft (such as by overhead cable), it is preferred that they provide less buoyancy than the combined buoyancy of the turbines 12, 14 together, and even more preferred that they provide less buoyancy than a single turbine 12, 14 individually. In each of the example above, the turbines provide the substantial majority of buoyancy. The turbines 12 and 14 may include one or more internal ballast bladders or compartments (not shown) with access ports to adjust total buoyancy as well as to balance forward-aft buoyancy and port-port buoyancy. Alternately, buoyancy may be adjusted with ballast on the frame.

The port longitudinal side member 26 supports a forward, port-side generator 32 toward the forward end of the member 26, while the starboard longitudinal side member 28 supports a forward, side-side generator 34 toward the forward end of the member 28. Each longitudinal side member 26, 28 supports an aft generator 33, 35 toward the aft ends of the members. A transmission system, such as chains or belts (not shown in FIG. 1), couples the hydro turbines 12, 14 to electric generators 32, 33, 34, 35 as discussed more fully below. A housing 22 coupled to the frame provides environmental protection for control, power conditioning and other equipment.

While the embodiment of FIG. 1 illustrates four generators at the forward and aft ends of platform 10, differing numbers of generators and/or locations may be used. For example, each of the longitudinal side members 26, 28 may support a single generator placed more centrally along the longitudinal side members to balance other loads on the platform. Alternately, the platform may have a single, centrally-placed generator. Ballast may be added to balance the platform. The embodiments herein are not limited to any specific number of generators or placement of generators.

The frame is adapted to attach to a single mooring buoy 20, preferably through lines attached at two points along a front crossbar 19. The buoy 20 in turn may attach through a chain to a bottom anchorage to form a "slack" mooring. With such a mooring, the platform may swing around the anchorage, which allows the platform to continue to operate in reversible stream flows, such as a tidal flow. Alternately, the platform may be moored to an overhead cable or other above-water structure or to a fixed pylon driven into the bottom. When the platform 10 is moored securely, water flow impinging on the helicoid working members 15, 17 causes the working members 15, 17 to rotate. Rotation of the working members in turn causes rotation of the rotors of electric generators 32, 33, 34, 35 and generation of electricity. The electricity may be transmitted to shore through underwater cable or overhead cable, depending on the nature of the mooring for a particular site. Alternately, electricity can be consumed on the platform itself, such as for purifying water or generating hydrogen fuel.

Figure 2:
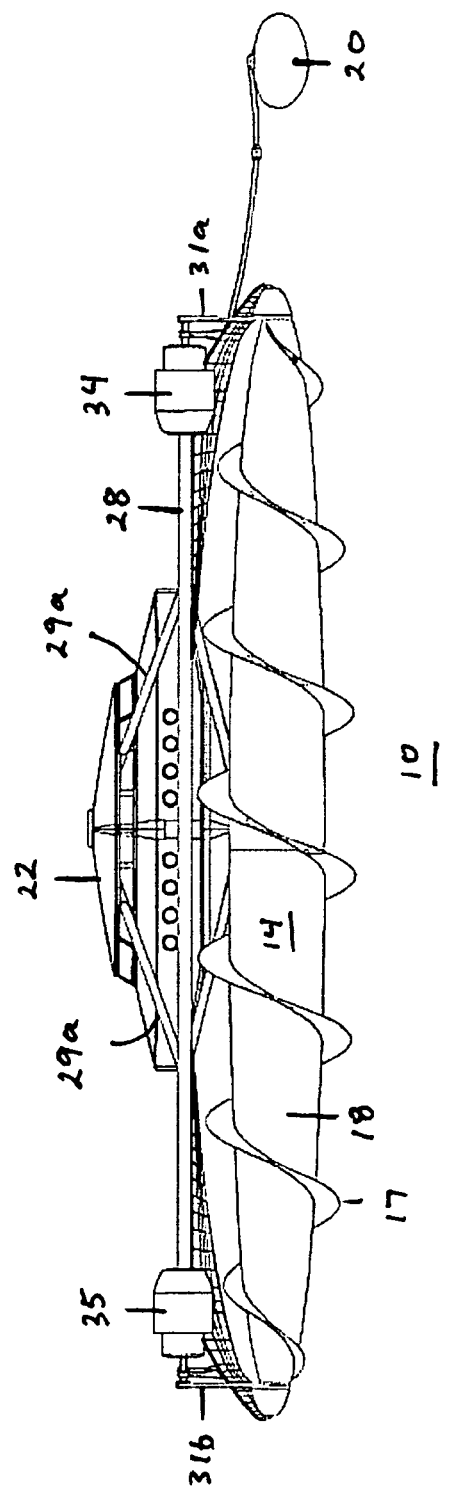
FIG. 2 illustrates a side plan view of a platform for generating electricity from a flowing fluid.

FIG. 2 is a starboard-side view of the platform 10 and mooring buoy 20 which illustrates an exemplary housing 22, starboard hydro turbine 14, and starboard generators 34, 35. The embodiment of FIG. 2 shows a single working member 17 on starboard turbine 14, though a different number of working members may be used. For example, in an alternate embodiment (not shown) a turbine may include two flights interleaved like double-start screw threads. FIG. 2 also illustrates an exemplary placement of elements of drive systems for the forward and aft generators 34, 35. In this embodiment, a forward starboard belt or chain 31a couples the forward starboard generator 34 to the forward end of starboard turbine 14, while an aft starboard belt or chain 31b couples the aft starboard generator 35 to the aft end of starboard turbine 14. This view also illustrates top struts 29a of the frame, which will be discussed further below in connection with FIG. 5.

Figure 3:
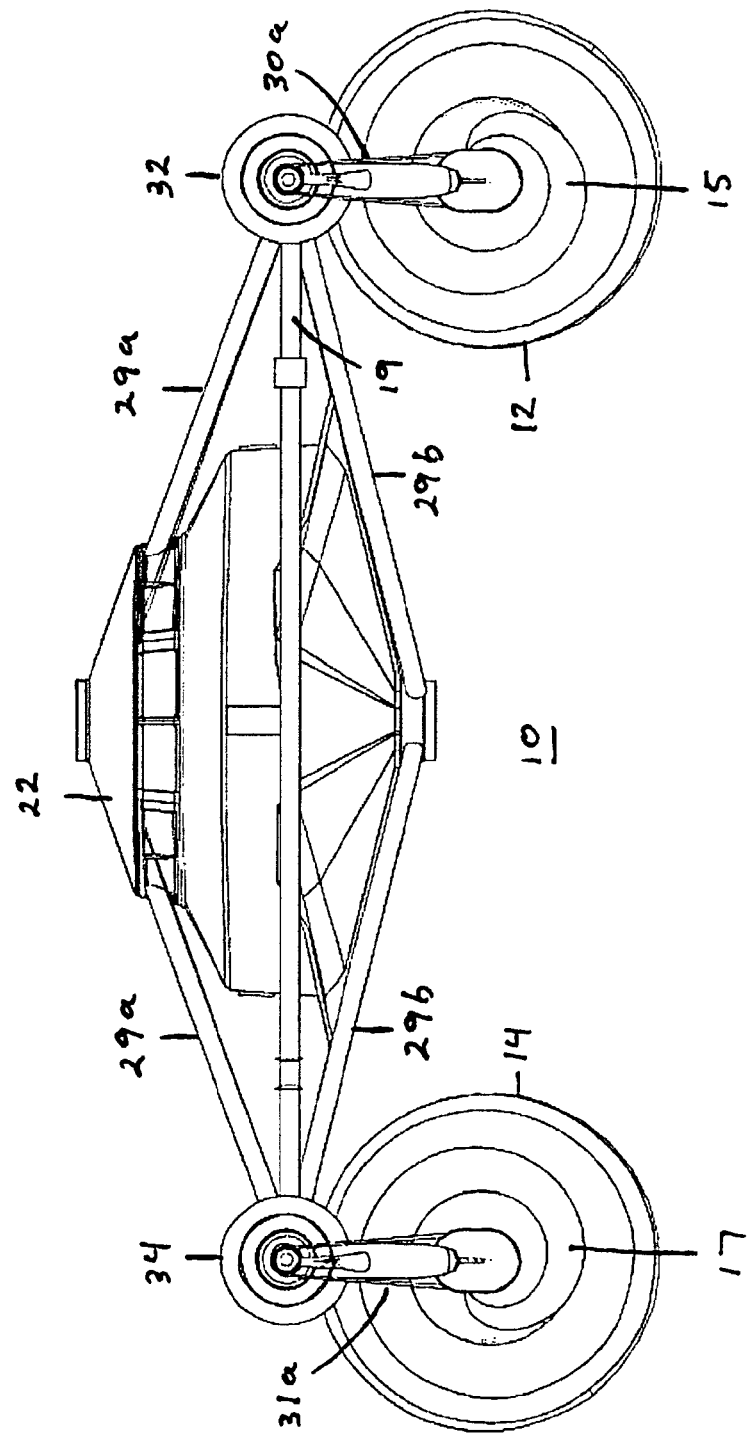
FIG. 3 illustrates a front plan view of a platform for generating electricity from a flowing fluid.

FIG. 3 is a forward-end view of platform 10 which illustrates an exemplary placing of housing 22, starboard and port hydro turbines 12, 14, forward starboard and port generators 32, 34, forward starboard and port drive belts or chains 30a, 31a, and elements of the frame, including mooring cross bar 19 and top struts 29a, 29b. From this view can be seen that the helicoid working members 15, 17 preferably turn in opposite directions, such that any lateral forces on turbines 12 and 14 at least partially (and preferably substantially entirely) offset each other to maintain the position of platform 10. This view also illustrates top struts 29a and bottom struts 29b of the frame, which will be discussed further below in connection with FIG. 5. FIG. 3 does not show a mooring buoy 20 secured to the crossbar 19. However those skilled in the art will appreciate that a buoy or other anchoring mechanism may be used to moor or securely position the platform 10.

Figure 4:
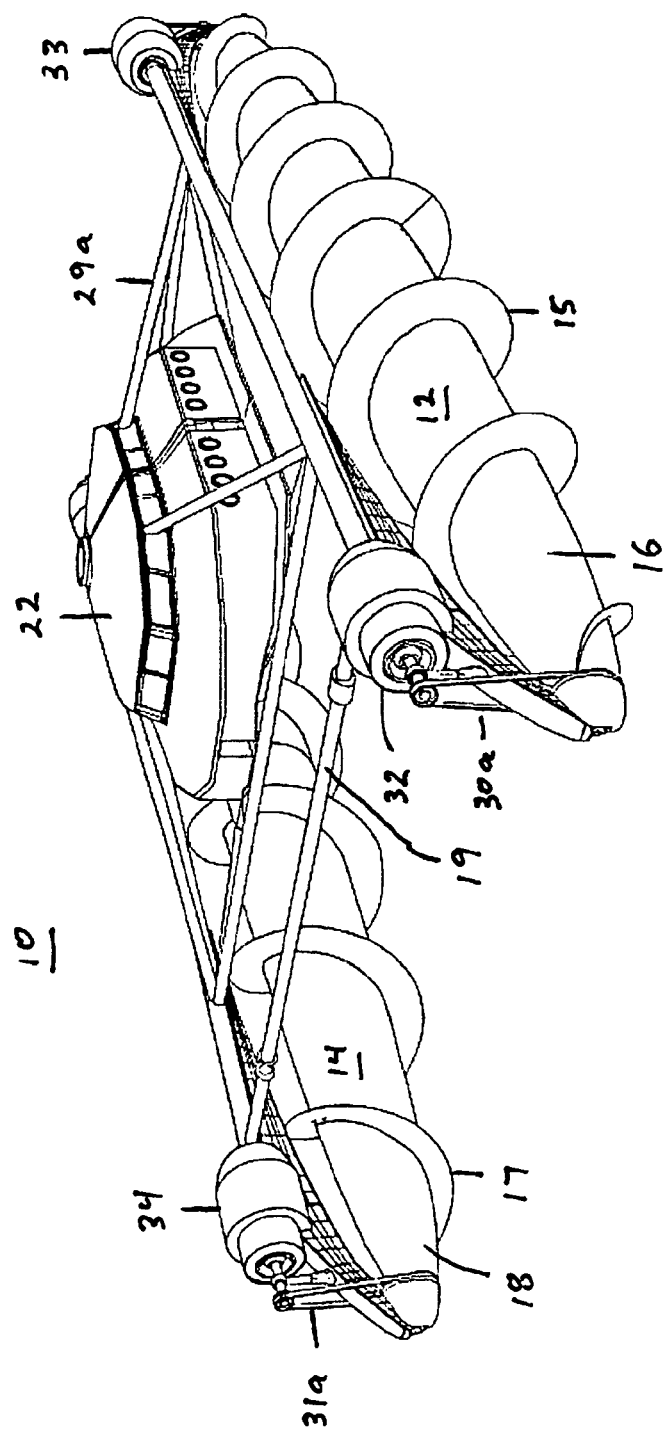
FIG. 4 illustrates a perspective view of a platform for generating electricity from a flowing fluid.

FIG. 4 is a perspective view of platform 10 which further illustrates an exemplary placing of housing 22, port and starboard hydro turbines 12, 14, forward starboard and port generators 32, 34, aft port generator 33, forward part and starboard drive belts or chains 30a, 31a, and elements of the frame, especially forward cross bar 19. From this view also can be seen that the helicoid working members 15, 17 turn in opposite directions. This view does not show a mooring buoy 20 secured to the crossbar 19. However those skilled in the art will appreciate that a buoy or other anchoring mechanism may be used to moor or securely position the platform 10.

Figure 5:
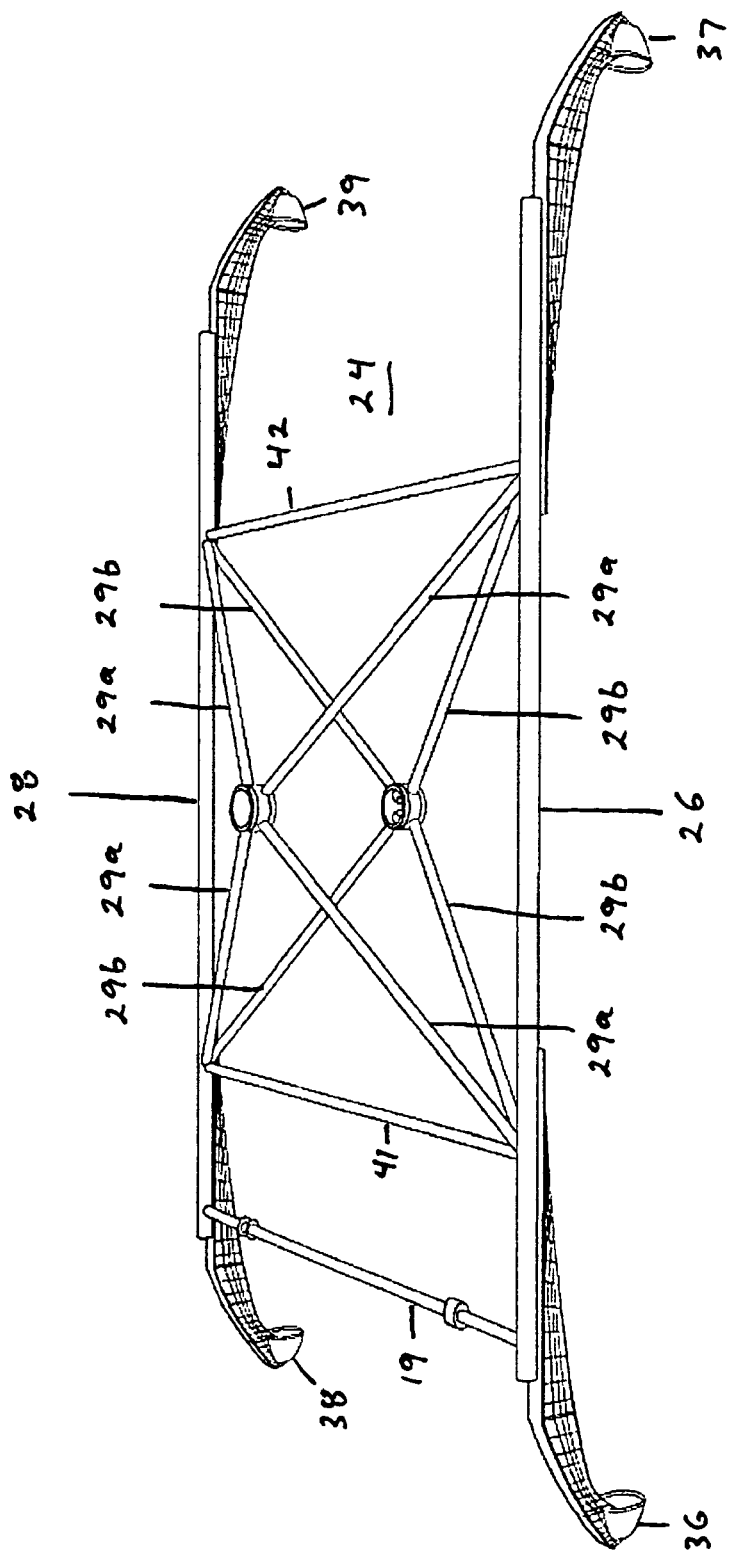
FIG. 5 illustrates a perspective view of the frame component of a platform for generating electricity from a flowing fluid.

FIG. 5 is a perspective view of the frame 24. The frame 24 includes port and starboard longitudinal members 26, 28 as previously discussed. A forward crossbar 41 runs generally perpendicular to the longitudinal members 26, 28 and connects to the longitudinal members 26, 28 in their forward halves. An aft crossbar 42 runs generally perpendicular to the longitudinal members 26, 28 and connects to the longitudinal members 26, 28 in their aft halves. The longitudinal members 26, 28 and crossbars 41, 42 thus form a generally planar, horizontal square with portions of the longitudinal members 26, 28 extending forward and aft beyond the crossbars 41, 42. From vertices of the square, or close thereto, four struts 29a converge at a vertex above the plane of the square, while four additional struts 29b converge at a vertex below the plane of the square, thus forming sides of an octahedron. The location of the vertices, if projected onto the plane of the square, would both lie in the center. The vertices may optionally be connected by a vertical pole (not shown). The struts 29a, 29b of the octahedron provides stiffness against twisting and sheer of the longitudinal members 26, 28. Additional and/or alternative bracing may be provided for frame strength and/or stiffness.

An additional forward crossbar 19 runs generally perpendicular to the longitudinal members 26, 28 and connects to the longitudinal members 26, 28 near the forward ends of the members. This additional forward crossbar 19 provides secure and convenient attachment points for a mooring.

Figure 6:
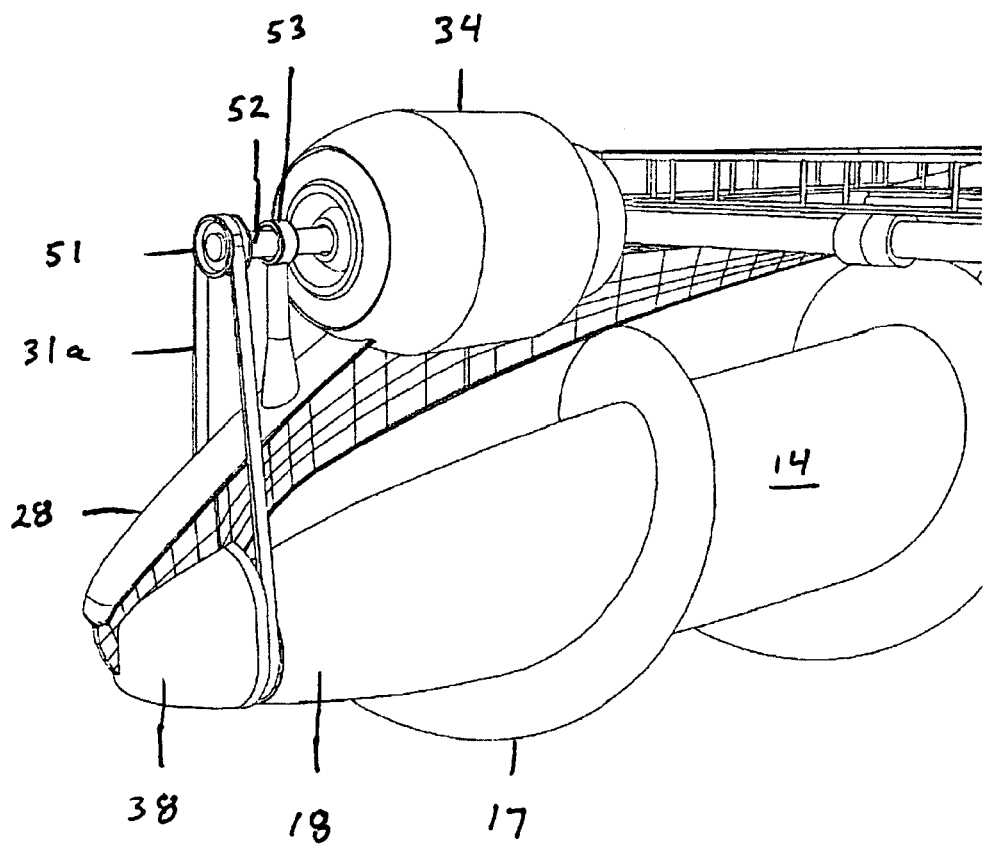
FIG. 6 illustrates a perspective view of exemplary generator and drive system components of a platform for generating electricity from a flowing fluid.

FIG. 6 is a perspective view of drive system components for a platform for generating electricity from a flowing fluid. While FIG. 6 illustrates only a portion of forward starboard turbine 14 and generator 34 it should be understood that in this embodiment a similar arrangement will be found for the forward port generator 32, and similar arrangements may be found for aft starboard and port generators 33, 35.

The starboard turbine 14 of this embodiment includes a helicoid working member 17 coupled in a one-to-one rotational relationship to the corresponding casing 18. That is, a single rotation of a working member 17 causes a single rotation of the corresponding casing 18 in the same direction of rotation. The working member 17 may mount directly and fixedly to the exterior of the casing 18. The starboard turbine 14 is rotatably mounted to a bearing (not shown) that is located within a cap 38 and coupled to the starboard longitudinal member 28. The cap 38 preferably has an outer profile that smooths flow to the starboard turbine 14 (and at the trailing edges of turbines, smooths flow away from the turbines). It also protects the bearing from debris strikes. A transmission element 31a, which may be a belt or chain, couples the turbine 14 to a shaft 52 through a pulley 51, or a pulley may be affixed directly to the exterior of the casing 18 near its end most point 51. The shaft 51 in turn drives the rotor of forward starboard generator 34. The shaft 52 couples through a bearing 53 to the starboard longitudinal member 28.

As moving liquid (e.g., flowing water) impinges on the helicoid working member 17, it causes rotation of the helicoid working member 17 and casing 18 about the bearing (located within cap 38). The rotation of the turbine 14 engages the belt or chain 31a, which transmits mechanical power through the pulley 51 and shaft 52 to the generator 34. The pulley diameter may be selected to cause the shaft 52 to rotate at a different rate than the turbine 14. That is, the pulley may cause the shaft 52 to rotate at a higher or lower RPM than the turbine 14.

The center line of the hydro turbine 14 may be beneath the water surface, therefore the bearing should be submersible and selected for prolonged, underwater operation. The cap 38 and forward end of the longitudinal member 28 may also be underwater or at the water surface and preferably will be made ruggedly to deflect debris and act as a shield for the bearing.

Figure 7:
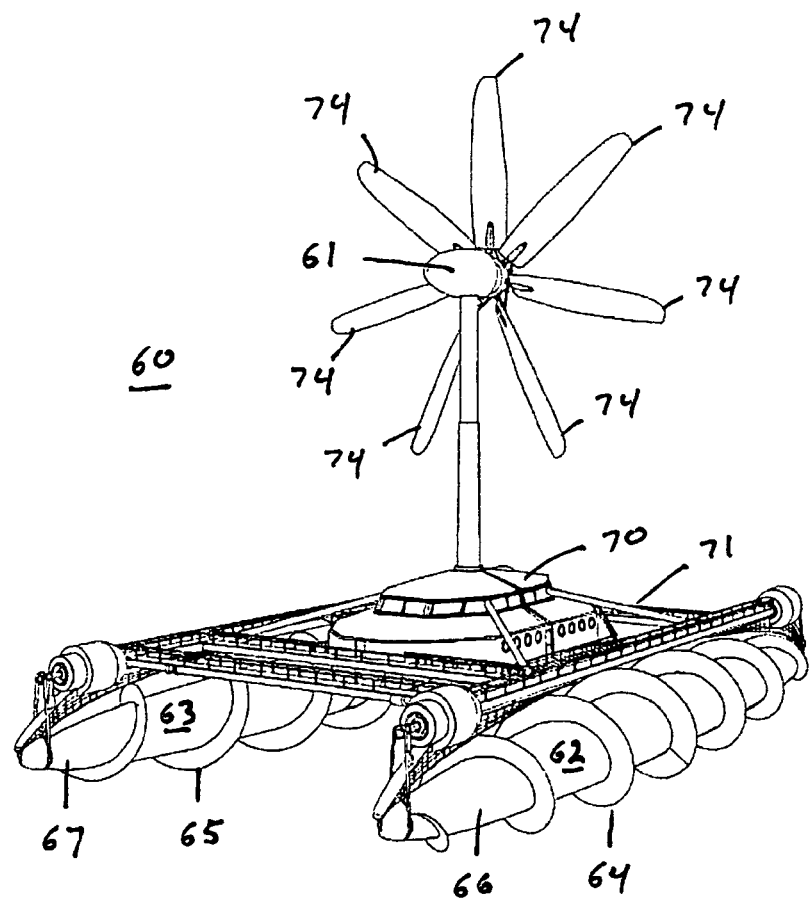
FIG. 7 illustrates a platform having a combination wind turbine and fluid turbine for generating electricity from a flowing fluid.

FIG. 7 is a view of a platform 60 having a combined wind turbine and hydro turbines. The platform 60 includes a frame 71, a port hydro turbine 62, and a starboard hydro turbine 63 similar to ones described above in connection with FIGS. 1-6. Each turbine 62, 63 has a helicoid working member 64, 65 preferably coupled in one-to-one rotational relationship with a corresponding casing 66, 67. A housing 70 provides environmental protection for control, power conditioning, and other equipment.

A wind turbine 61 is positioned upon the housing 70. In one embodiment, the wind turbine 61 is a horizontal axis wind turbine having multiple blades 74, and more particularly may be a wind turbine as disclosed in copending U.S. Patent Application 61/202,189 filed Feb. 4, 2009 and entitled "Folding Blade Turbine." Other wind turbines may be used.

Figure 8A:
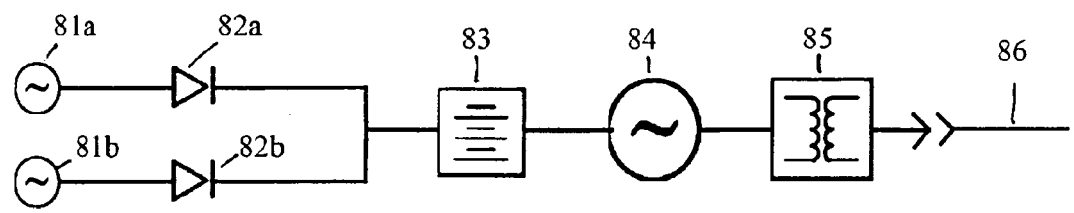
FIGS. 8a and 8b are schematic diagrams of preferred power conditioning circuitry for a platform for generating electricity from a flowing fluid.
Figure 8B:
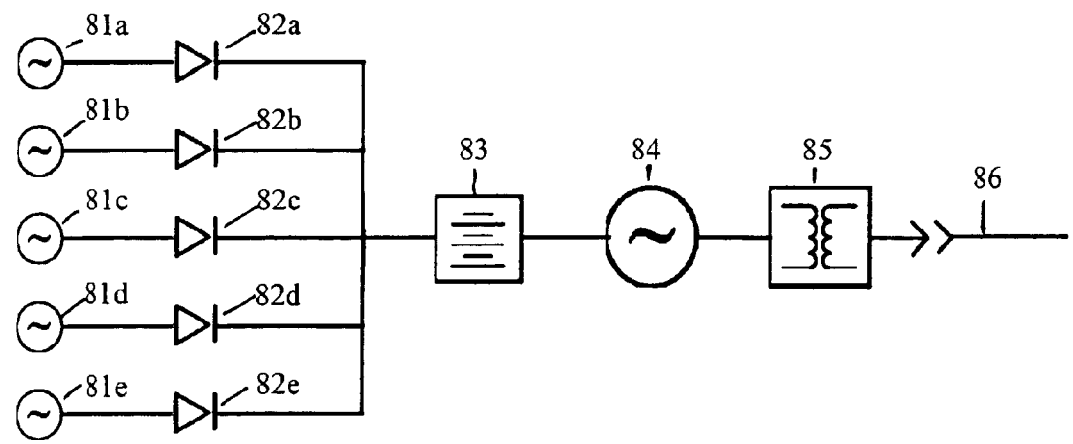

FIGS. 8a and 8b are schematic diagrams of preferred power conditioning circuitry for a platform for generating electricity from a flowing fluid. FIG. 8a is a schematic for a platform having two generators, such as a single port-side generator 81a and a single starboard-side generator 81b. Each generator 81a, 81b produces alternating current (AC) electricity having a frequency and voltage that may vary according to the rotation rate of the turbines (not shown) and the electrical load on the generator circuit. Rectifiers 82a, 82b convert the AC electricity into direct current (DC) electricity at a DC working voltage used internally to the platform. An optional battery 83 and/or other storage elements (e.g., capacitors) provide(s) combined storage for electricity produced by the two generators. An inverter 84 converts the combined DC electricity into AC electricity having a regulated frequency appropriate for a customer and having an AC working voltage used internally to the platform. A transformer 85 provides electrical isolation between the platform and a transmission circuit 86. The transformer 85 may also increase the voltage of the AC electricity from the AC working voltage to a voltage appropriate for transmission to a customer.

The circuitry of FIG. 8a can be adapted for additional generators by adding additional rectifiers. FIG. 8b is a schematic for a platform having four generators 81a, 81b, 81c, 81d for fluid turbines and a fifth generator 81e for a wind turbine. Additional rectifiers 82c, 82d, 82e convert AC electricity into DC electricity at the DC working voltage. The battery 83, inverter 84 and transformer 85 perform the same functions as in FIG. 8a, except that their ratings may be increased, such as by increasing the storage capacity of the battery 83 and the current capacity of the inverter 84 and transformer 85. Additional circuitry may be provided, such as fuses, switches, monitoring equipment, etc.

Figure 9:
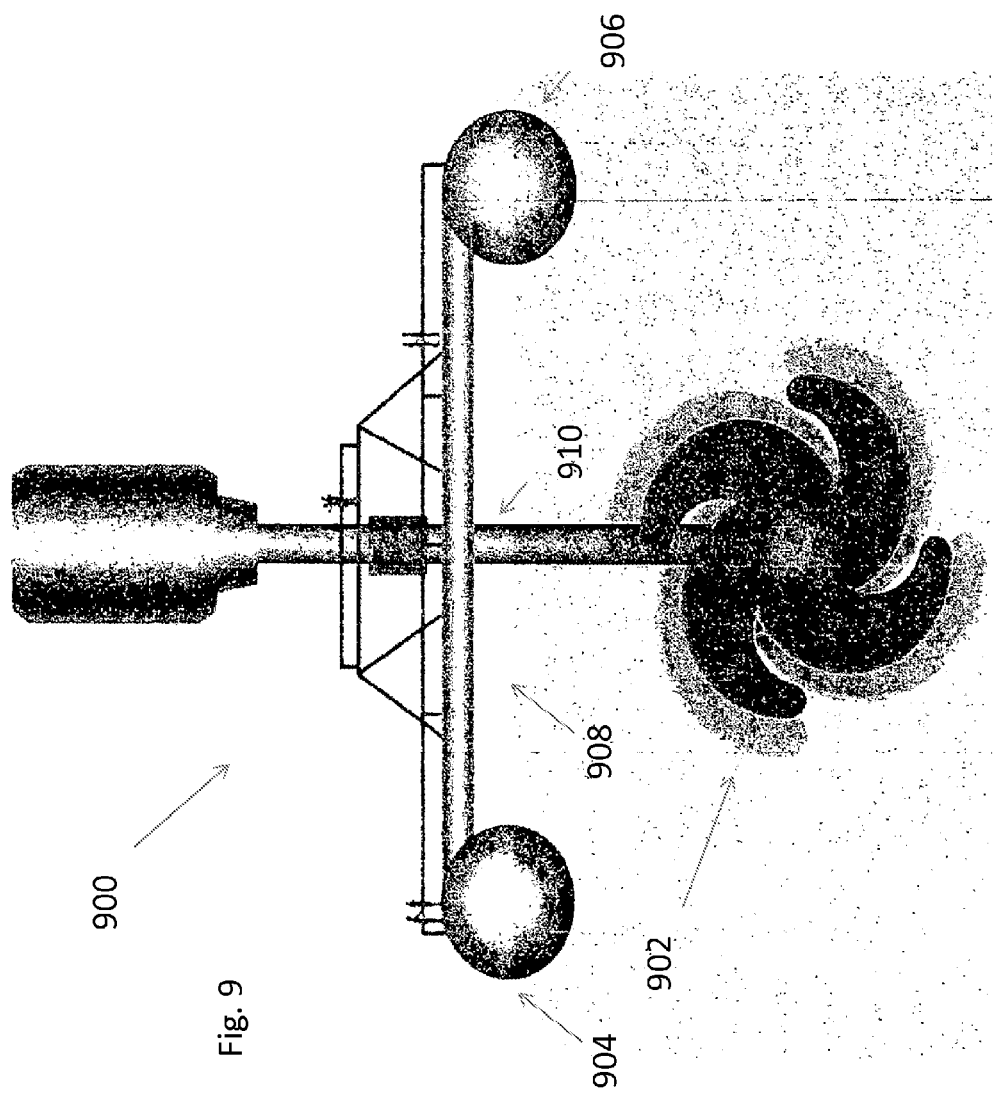
FIGS. 9 and 10 are front view and side view, respectively, of another embodiment of the invention.
Figure 10:
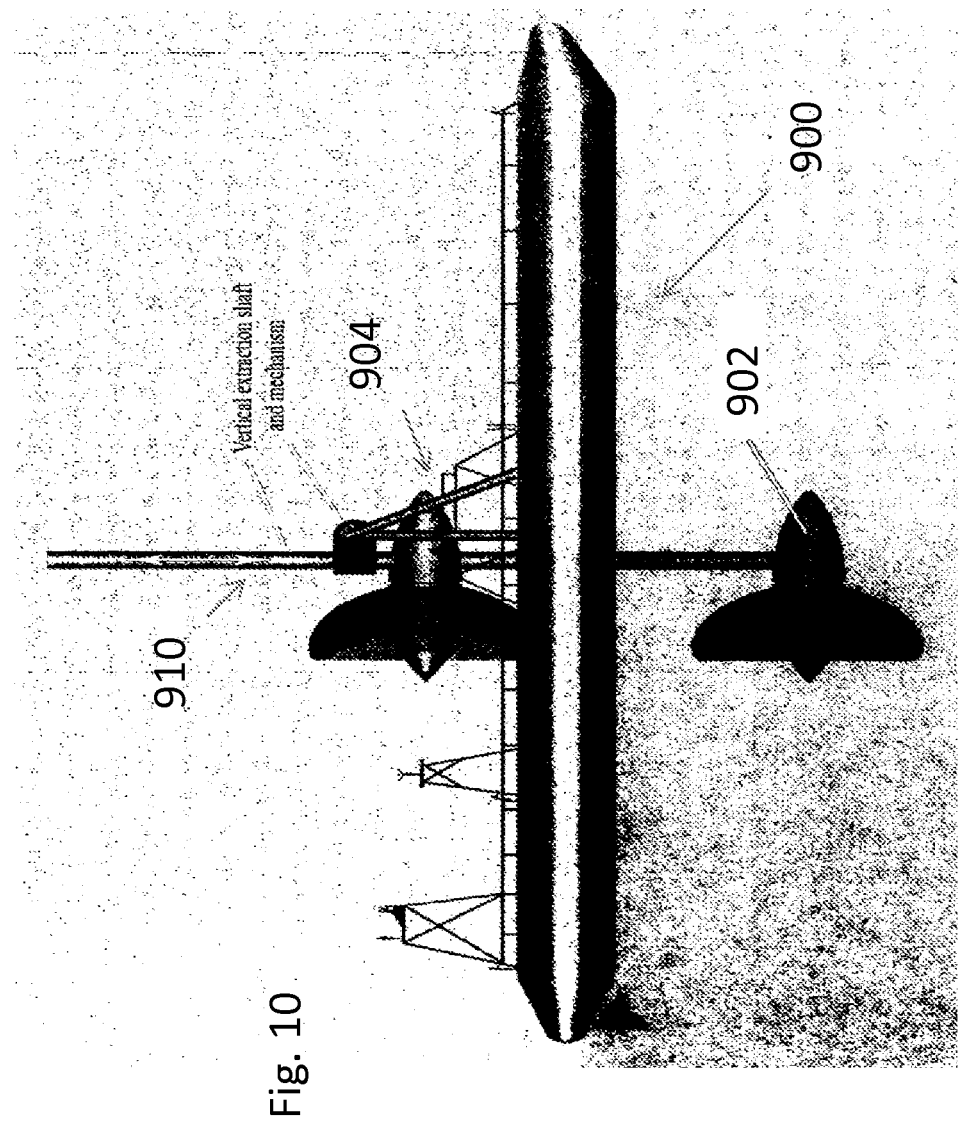

Referring now to FIGS. 9 and 10, another embodiment of the invention is shown. In this embodiment, a platform 900 has a turbine 902 and two lateral side members 904 and 906. As seen by the water line in FIGS. 9 and 10, lateral side members 904 and 906 provide buoyancy to platform 900. A series of supporting components may form a frame 908 that bridges the two lateral side members 904 and 906. A shaft 910 of frame 908 supports turbine 902 between the two lateral side members 904 and 906. Turbine 902 may be vertically raised and lowered into and out of the water along the shaft to a higher point on platform 900.

Where a platform has both water and wind turbines, electrical power generation from the different resources will be non-correlated to some degree. This may result in reduced net variation in power output of the platform when compared to wind or water turbine generation alone. This reduced variation means the battery storage capacity may be less than would be required for separate wind and water installations.

The embodiments described above are intended to be illustrative but not limiting. Various modifications may be made without departing from the scope of the invention. The breadth and scope of the invention should not be limited by the description above, but should be defined only in accordance with the following claims and their equivalents.

What is claimed is:

1. An electricity-generating platform having a buoyancy to at least partial submerge when placed in a stream of water, comprising:
   a fluid turbine configured to rotate about an axis when placed in a stream of flowing water;
   an electric generator adapted to generate electricity in response to rotation of the turbine;
   first and second buoyant lateral side supports, the turbine being mounted between the side supports; and
   a support frame connecting the first and second lateral supports to the turbine;
   wherein the buoyancy of the platform is such that the turbine is at least partially submerged when the platform is placed in the stream of water;
   the support frame being configured to vertically move the turbine to adjust a depth of the turbine relative to the first and second lateral side supports.

2. The platform as in claim 1, wherein the fluid turbine has a generally prolate shape.

3. The platform as in claim 1, wherein the fluid turbine includes a casing supporting at least one working member configured to spin when in engagement with fluid flow, the casing having a generally prolate shape.

4. The platform as in claim 1, wherein the fluid turbine includes a casing supporting at least one helicoid working member configured to spin when in engagement with fluid flow, the at least one helicoid working member has an outer edge defining a generally prolate shape from at least a midpoint to a front of the turbine.

5. An electricity-generating platform having a buoyancy to at least partial submerge when placed in a stream of water, comprising:
   a fluid turbine configured to rotate about an axis when placed in a stream of flowing water, the fluid turbine comprising:
      a casing; and
      at least one helicoid working member fixedly attached to the casing;
   an electric generator adapted to generate electricity in response to rotation of the turbine;
   first and second buoyant lateral side supports, the turbine being mounted between the side supports; and
   a support frame connecting the first and second lateral supports to the turbine;
   wherein the buoyancy of the platform is such that the turbine is at least partially submerged when the platform is placed in the stream of water;
   the support frame being configured to vertically move the turbine to adjust a depth of the turbine relative to the first and second lateral side supports.

6. The platform as in claim 5, wherein the fluid turbine has a generally prolate shape.

7. The platform as in claim 5, wherein the casing has a generally prolate shape.

8. The platform as in claim 5, wherein the at least one helicoid working member has an outer edge defining a generally prolate shape from at least a midpoint to a front of the turbine.

* * * * *